May 19, 1970     R. M. WARREN, JR     3,512,470

VENTILATOR OUTLET BODIES

Filed Feb. 19, 1968

INVENTOR
Robert M. Warren, Jr.
BY
Smythe & Moore
ATTORNEYS

United States Patent Office 3,512,470
Patented May 19, 1970

---

3,512,470
VENTILATOR OUTLET BODIES
Robert M. Warren, Jr., Red Bank, N.J., assignor to Aeronca, Inc., New York, N.Y., a corporation of Ohio
Filed Feb. 19, 1968, Ser. No. 706,587
Int. Cl. F24f *13/00*
U.S. Cl. 98—101     2 Claims

ABSTRACT OF THE DISCLOSURE

An outlet body for air heaters, ventilators or the like wherein mitering at the corners is eliminated and which includes an extruded continuous aluminum strip face plate having preformed depending side webs. The side webs are of lesser lengths than the face plate and closure plates are arranged at the ends thereof so that the webs and closure plates are inset relative to the face plate and the latter overlies the ends thereof. Spaced longitudinal arcuate channels are formed in inner faces of the webs to provide seats for louvers, and suitable openings are provided in the face plate.

---

This invention relates to outlet bodies such as are used in conjunction with ventilators, air heaters, air conditioning or similar apparatus inset in walls or ceilings.

A primary object of the invention is the provision of an improved outlet body of this nature formed with a face plate and side webs integral with the face plate, and characterized by the elimination of mitered corners on the face plate.

A further object of the invention is the provision of an outlet body wherein the side webs are preformed with the necessary channels for the hinge pins of movable louvers or the like, and wherein integrally formed means are provided for the support of a removable bottom plate if desired.

Still other objects are in the sequence of operations, composition of elements and arrangement of components, which will be more fully described hereinafter.

In a preferred embodiment of the invention, an extrusion die is preformed and a composite continuous strip of aluminum is extruded, which includes a face plate and inset substantially perpendicular side webs, the webs being formed with continuous channels or openings for the reception of internal components such as the hinge pins of louvers or the like, so that no further machining or operation on the side webs is required. The continuous strip is severed into required lengths, and the side webs are undercut to provide overlyling end flanges on the face plate. Closure plates are provided for the ends of the spaced webs, and openings are stamped in the face plate between the side webs and the closure plates. Internal components, such as louvers, are positioned in the preformed channels in the side webs, and the device may be installed as a unitary structure.

Other advantages, objects and features of the invention will become apparent from the following description and drawings which are merely exemplary.

Figure 1:
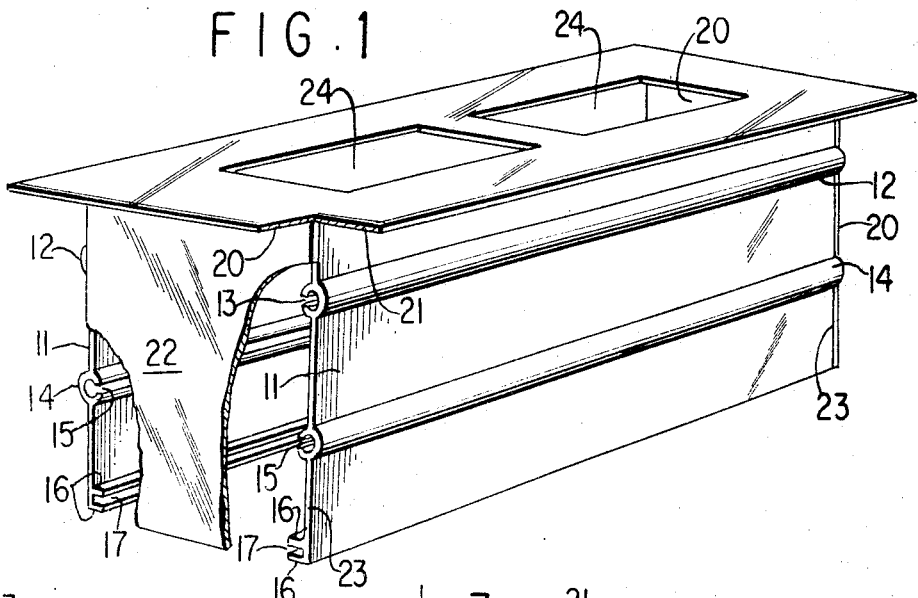
FIG. 1 is a perspective view of one form of extruded outlet body constructed in accordance with the invention.

In the invention, a continuous body, preferably of aluminum, although other extrudable materials may be employed, is extruded from any desired conventional extrusion apparatus, and consists of a face plate 10 having a pair of opposed depending parallel side webs 11.

In a preferred embodiment of the invention, the side webs or walls are provided with upper, continuous, substantially circular channels 12 which have confronting, inwardly facing openings 13, and similar lower channels 14 having confronting, inwardly facing openings 15. The channels provide seats for the hinge pins of louvers or the like (not shown) of any desired configuration, but which may conform to those shown in U.S. Pat. No. 2,821,897 to J. W. Kreuttner.

The lower ends of the side webs 11 are provided with spaced, parallel, inwardly facing flanges 16 which define slots 17 for the reception of a bottom plate or the like.

Figure 2:
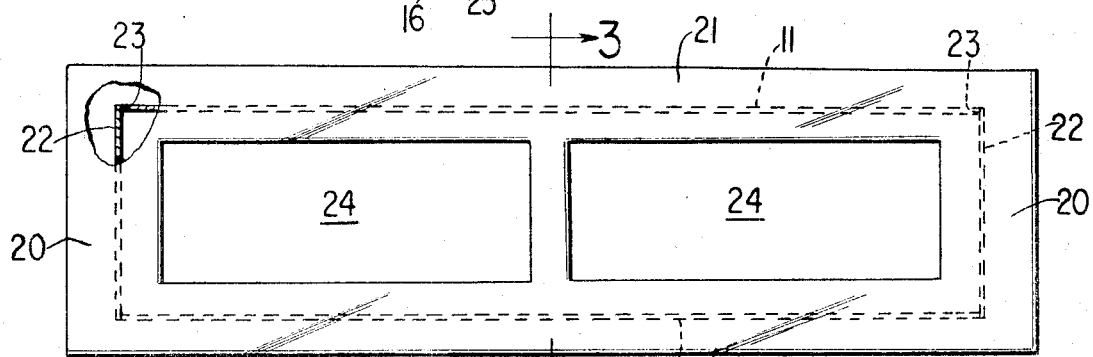
FIG. 2 is a top plan view thereof.
Figure 3:
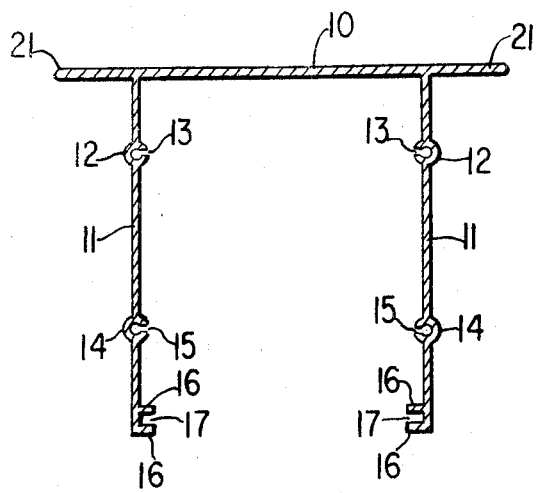
FIG. 3 is a cross sectional view taken substantially along the line 3—3 of FIG. 2 prior to complete assembly, or of a continuously extruded body in accordance with the invention.

The extruded continuous strip of body material formed as above indicated is severed at suitable spaced intervals to provide a body as shown in FIGS. 1 and 2. The side webs 11 are undercut to a lesser length than the top plate 10 to provide end flanges 20 of a length substantially equal to the side flanges 21 which are defined by the insetting of the webs 11 relative to the face plate 10.

Closure plates 22 are cut to a desired length and secured between the spaced undercut ends 23 of the side webs 11. Any suitable number of openings 24 are then stamped in the face plate 10 between the side webs 11 and the closure plates 22. If desired, the stamping operation may take place prior to the severing and closing of the side webs 11.

The internal components, such as louvers or the like, may be installed before or after the positioning of the closure plates, in accordance with the construction thereof, and a bottom plate may similarly be inserted in openings 17 if desired.

The completely assembled unit may then be installed in a wall opening or the like as a controllable closure for ventilators, wall heaters, air conditioning units, or similar devices.

The face plate is characterized by extreme simplicity and the absence of mitered corners or other unsightly deformations which have hitherto been necessary in the production of outlet bodies for the specified purpose.

What is claimed is:

1. An outlet body for a ventilator and the like comprising a unitary extruded aluminum body consisting of an apertured face plate and integral parallel side webs spaced inwardly from the side edges of the face plate, the webs terminating short of the ends of the face plate, closure plates extending across the ends of the spaced webs, said face plate having at least one opening between the side webs and the closure plates, and means defining integral spaced, confronting and arcuate longitudinal channels for the reception of louver hinges in said side webs, and inwardly facing confronting slots formed in the lower ends of said webs for sliding reception of a bottom plate.

2. An outlet body according to claim 1 wherein at least two channels are formed in each of said side webs.

References Cited

UNITED STATES PATENTS

| | | | |
|---|---|---|---|
| 2,928,332 | 3/1960 | Goettl | 98—110 XR |
| 3,223,019 | 12/1965 | Schuh | 98—101 XR |
| 3,254,587 | 6/1966 | Sweeney | 98—110 XR |
| 3,308,745 | 3/1967 | Davies | 98—41 XR |
| 3,126,811 | 3/1964 | Kennedy | 98—40 |
| 3,320,869 | 5/1967 | Schach | 98—40 |

MEYER PERLIN, Primary Examiner

U.S. Cl. X.R.

98—40, 102, 106